M. S. KIMBUL.
LIQUID CARBONATING APPARATUS.
APPLICATION FILED DEC. 18, 1917.
1,373,892.
Patented Apr. 5, 1921.
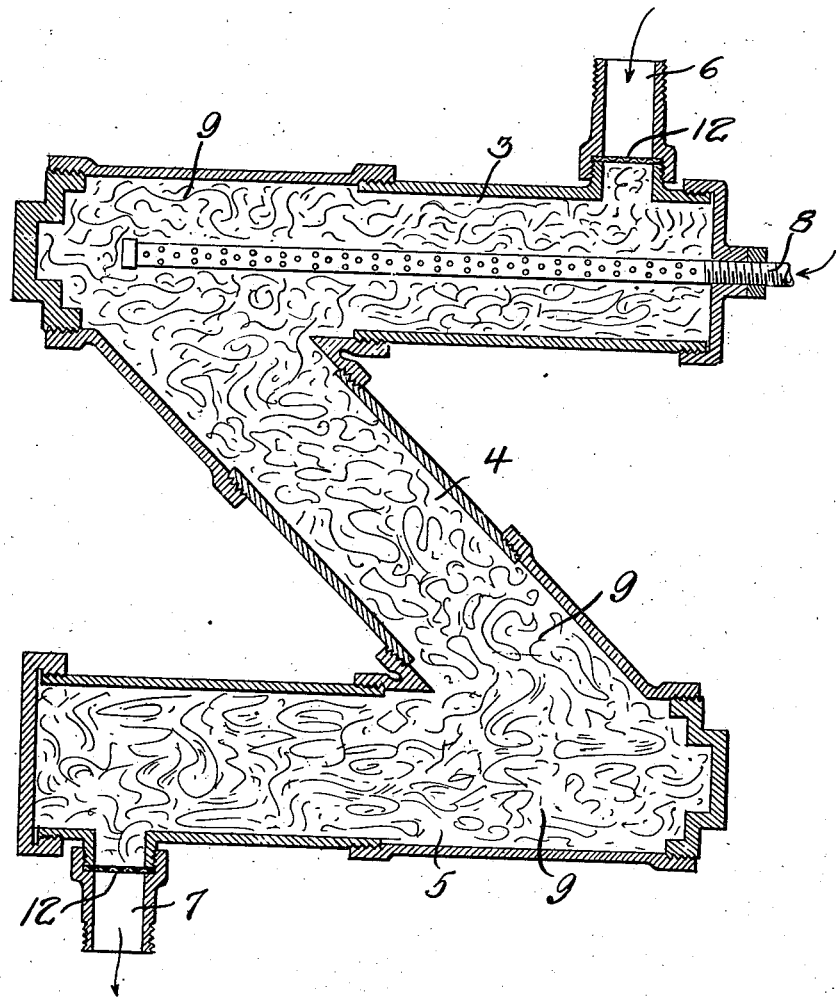
Witness
J. B. Gardner
INVENTOR
M. S. KIMBUL
By White & Prest
ATTORNEYS

UNITED STATES PATENT OFFICE.

MORTON S. KIMBUL, OF OAKLAND, CALIFORNIA.

LIQUID-CARBONATING APPARATUS.

1,373,892. Specification of Letters Patent. Patented Apr. 5, 1921.

Application filed December 18, 1917. Serial No. 207,694.

*To all whom it may concern:*

Be it known that I, MORTON S. KIMBUL, a citizen of the United States, and a resident of Oakland, county of Alameda and State of California, have invented a certain new and useful Liquid-Carbonating Apparatus, of which the following is a specification.

The invention relates to an apparatus for producing carbonated liquid and particularly carbonated water.

An object of the invention is to provide an apparatus for producing a relatively stable carbonated liquid.

Another object of the invention is to provide an apparatus of such construction that in a comparatively small space sufficient surface is obtained to effect the desired solution of the gas in the liquid.

The invention possesses other advantageous features, some of which, with the foregoing, will be set forth at length in the following description, where I shall outline in full that form of the invention which I have selected for illustration in the drawing accompanying and forming part of the present specification. In said drawing I have shown one specific form of the apparatus of my invention, but it is to be understood that I do not limit myself to such form, since the invention as expressed in the claims may be embodied in a plurality of forms.

The drawing is a vertical section of one form of apparatus of my invention.

The apparatus consists of a container preferably formed of three connected tubes 3, 4, 5, the tubes 3 and 5 being horizontal and the tube 4 being inclined, and connecting the opposite ends of the tubes 3 and 5. The upper tube 3 is provided on that end remote from its connection with tube 4, with a liquid inlet port 6, and the lower tube 5 is provided on that end remote from its connection with the tube 4, with a carbonated liquid discharge port 7, so that the liquid flows completely through the three tubes before it discharges.

Extending into the upper tube 3 and preferably concentrically-disposed therein, is an apertured gas conduit 8. The liquid is introduced into the tube 3 under pressure, usually the normal hydrant pressure, and the gas is introduced through the tube 8 at a pressure approximately the same as the liquid.

I have found that by filling the container with metallic shavings or filiform metal, that the liquid and gas are so broken up and are brought into intimate contact over a large area, that the gas is dissolved in the liquid with extreme readiness and that the carbonated liquid produced retains the gas in solution for relatively long periods of time, approximately twenty-four hours. The apparatus finds its principal use in the production of carbonated water and when so used, water is introduced through the inlet 6 and carbonic acid gas is introduced through the conduit 8.

When the apparatus is used for the production of carbonated water, the filling 9 in the container consists of tin shavings or ribbons which are more or less firmly packed in the container. Tin shavings are preferable on account of the high degree of stability of tin to water and carbon dioxid and carbonic acid. The shavings are prevented from discharging from the container by suitable screens 12 arranged at the inlet and discharge ports.

The water on entering the container is broken up and dispersed by the tin shavings, thoroughly wetting the surfaces of the shavings and thereby exposing a large surface of the water. The carbon dioxid discharged from the conduit is likewise broken up into very small bubbles by the tin shavings and is brought into intimate and recurring contact with the surfaces of the water. The intimate and finely-divided mixture of water and gas formed in the upper horizontal tube 3 then flows downward through the more or less packed filiform tin in the inclined tube 4, wherein the gas has a tendency to flow upward, due to its buoyancy. The mixture is thoroughly agitated in the tubes 4 and 5 and the particles of liquid and gas flow in paths of ever-changing direction, thereby causing recurrent impact and collision of the water and gas particles, with the result that a perfect carbonated water is produced. The water carries gas in suspension as well as in solution, so that if used for bathing purposes as soon as it has passed through the apparatus, it has the stimulating effect of very highly charged water. The carbonation of the water may be increased, if desired, by bringing the water and gas together at higher pressures.

The preferred form of the device embodies a pair of substantially parallel intake and discharge elements that are connected by an intermediate diagonal portion arranged at an angle of about 45° between the parallel elements. Further, the desired strength of construction and security and tightness of the joints may be secured and at the same time the whole device constructed in an inexpensive manner by the organization of simple pipe fitting elements requiring little or no structural change from the condition in which they are usually obtained on the market. By the utilization of end branch fittings with their coaxially connected nipples, the diagonal intermediate nipple is readily secured and provides a desired outline or configuration of the device and, moreover, by utilizing plugs insertible in the open ends of the branches it is possible to readily inspect the interior and, if necessary, to remove and replace the filling substance 9. The end plugs permitting ready inspection and the removal and replacement of the filling are designated at 10; the upper plug when removed permitting the outward withdrawal of the filling 9 through the upper horizontal chamber portion while the lower plug 10 enables the outward withdrawal of the filling from the lower horizontal portion and also, from the diagonal portion 4.

I claim:

1. An apparatus for carbonating liquid, comprising a vertical chamber having a horizontal upper compartment, a lower compartment parallel thereto and an oblique compartment connecting diagonally opposite ends of the said compartments at an angle of about 45° to form sharp return flow currents in the flowing liquid, inlet and outlet means for the liquid, means for supplying carbonating gas to the upper compartment, and a filling in the chamber for intimately mixing the gas and liquid.

2. An apparatus for carbonating liquid, comprising a vertical chamber having a horizontal upper compartment, a lower compartment parallel thereto and an oblique compartment connecting diagonally opposite ends of the said compartments at an angle of about 45° to form sharp return flow currents in the flowing liquid, inlet and outlet means for the liquid, means for supplying carbonating gas to the upper compartment, and a filling in the chamber for intimately mixing the gas and liquid, said gas supply means including a central perforate tube of a length approximately that of the upper compartment.

3. An apparatus for carbonating liquid, comprising a pair of branch fittings with their side branches set in diagonally opposite position and attached by a shoulder nipple, nipples attached to line end of each branch, plugs in the opposite ends, caps on the extended nipple ends, a nozzle extended through one cap for the supply of a gas to the relative compartment, liquid inlet and outlet means at terminals of the assembled parts, and a filling in the chamber thus formed and through which the carbonating gas and liquid traverse to the outlet.

In testimony whereof, I have hereunto set my hand at Oakland, California, this tenth day of December, 1917.

MORTON S. KIMBUL.

In presence of—
J. B. GARDNER,
R. N. CHAMBERS.